UNITED STATES PATENT OFFICE.

GIDEON E. MOORE, OF NEW YORK, N. Y.

PROCESS OF MANUFACTURING PIGMENTS.

SPECIFICATION forming part of Letters Patent No. 518,963, dated May 1, 1894.

Application filed September 19, 1893. Serial No. 485,890. (No specimens.)

*To all whom it may concern:*

Be it known that I, GIDEON E. MOORE, a citizen of the United States, and a resident of the city of New York, county and State of New York, have invented certain new and useful Improvements in Processes of Manufacturing Pigments, of which the following is a specification.

My invention consists in processes for the manufacture of pigments from native minerals consisting essentially of intimate mixtures of carbonate of manganese and carbonate of lime, with or without carbonate of magnesia, such as for instance the minerals known as spartaite, manganocalcite and the like all of which in the following description will be termed "manganiferous limestone."

In carrying out my invention I proceed as follows: I take the manganiferous limestone as it comes from the quarry or mine and, if necessary, break it into pieces of any suitable size and calcine, or roast it in a kiln or furnace of any known suitable form, size, material or mode of operation, until it has become deprived of more or less of its carbonic acid and has acquired the property of slaking, or disintegrating, or falling to powder or to particles of greater or less degree of fineness when subjected to the action of water, steam or exposure to the atmosphere. The calcination may be effected in an atmosphere of either reducing or oxidizing, or neutral gases, but I prefer to use an oxidizing atmosphere in the kiln or furnace and consider what is known as a perpetual flame kiln with separate firings, or a reverberatory furnace, to be a suitable furnace to be used therewith. If the calcination has been conducted in a reducing atmosphere, the calcined material will usually be found to be but little darkened in color; if it has been conducted in an oxidizing atmosphere, the calcined material will be more or less brown in color, owing to the formation of one or more of the higher oxides of manganese, such as, for instance, the sesquioxide or the protosesquioxide of manganese. When properly calcined I take the calcined material and slake it either by acting upon it with water or steam, or by exposing it to the atmosphere to cause it to disintegrate by the process known as air-slaking. When the calcination has been conducted in an atmosphere of reducing gases, or in contact with reducing materials, such as the fuel in the ordinary lime kiln, the calcined material will usually be found to contain more or less protoxide of manganese, which is devoid of coloring power. For the purpose of transforming this protoxide of manganese into the higher, or brown, oxides of manganese it is necessary in such cases to expose the calcined material, either with or without previous slaking, to the action of the air until sufficient oxygen has been absorbed to produce the desired brown color. The calcined and freshly slaked material contains more or less calcium hydrate and for this reason is not adapted for many uses as a pigment. It furthermore frequently contains particles of other minerals either of no value as pigments or of value for other applications, which may be removed from the slaked and disintegrated material by sifting, screening, washing, or other simple mechanical means.

To destroy the causticity of the calcium hydrate and render the pigment suitable for use as an oil color I either expose it to the air, preferably in a moist state, until the said calcium hydrate or as much of it as may be necessary has become converted into carbonate by absorption of carbonic acid from the air, or I subject it to the action of carbonic acid derived from other sources, but I prefer to use the carbonic acid derived from the calcination of manganiferous limestone itself by exposing the calcined and slaked or disintegrated material to the action of the gases from the kiln or furnace in which fresh portions of the manganiferous limestone are being calcined. During this exposure it is advantageous to turn or move the material from time to time so as to expose fresh surfaces to the action of the gases. When the manganiferous limestone contains particles of objectionable minerals, or such as it may be desired to use for other applications, it is sometimes expedient to subject the calcined and slaked material to the action of carbonic acid before proceeding to remove the particles of foreign materials. The product is a brown pigment the shade or intensity of color of which is, other things being equal, more or less dependent upon the proportion of oxides of manganese contained therein. It is easily ground and, when used in oil, furnishes a paint of great beauty of color, of good body and well adapted for use either alone or in the manufacture of mixed paints.

Having thus described my invention, what I claim as new, and desire to secure by Letters Patent, is—

1. The within described process of manufacturing pigments from manganiferous limestone, which consists in removing carbonic acid from the same, oxidizing the manganese in the same to brown oxide and charging the lime or other alkaline earths present with carbonic acid substantially as described.

2. The within described process of manufacturing pigments from manganiferous limestone which consists in removing carbonic acid from the same, oxidizing the manganese in the same to brown oxide, charging the lime or other alkaline earths present with carbonic acid and removing the particles of foreign impurities from the same by mechanical separation substantially as described.

3. The within described process of manufacturing brown pigments from manganiferous limestone which consists in calcining the same, causing the calcined material to slake or disintegrate by hydration, oxidizing the manganese in the same to brown oxide, and acting upon the lime therein with carbonic acid substantially as described.

4. The within described process of manufacturing brown pigments from manganiferous limestone which consists in calcining the same, causing the calcined material to slake or disintegrate by hydration, oxidizing the manganese in the same to brown oxide, separating the calcined and slaked material from intermixed particles of foreign impurities by mechanical separation and acting upon it with carbonic acid substantially as described.

In testimony that I claim the foregoing as my invention I have signed my name, in presence of two witnesses, this 18th day of September, 1893.

GIDEON E. MOORE.

Witnesses:
EDWARD SCHROEDER,
ARPÁD OSGYÁNI.